US008616817B2

(12) United States Patent
Siemers

(10) Patent No.: US 8,616,817 B2
(45) Date of Patent: Dec. 31, 2013

(54) SCREW NAIL

(75) Inventor: Stefan Siemers, Burghausen (DE)

(73) Assignee: Raimund Beck Nageltechnik GmbH, Mauerkirchen (AT)

( * ) Notice: Subject to any disclaimer, the term of this patent is extended or adjusted under 35 U.S.C. 154(b) by 0 days.

(21) Appl. No.: 13/511,864

(22) PCT Filed: Nov. 24, 2009

(86) PCT No.: PCT/EP2009/008362
§ 371 (c)(1),
(2), (4) Date: Oct. 2, 2012

(87) PCT Pub. No.: WO2011/063820
PCT Pub. Date: Jun. 3, 2011

(65) Prior Publication Data
US 2013/0017035 A1  Jan. 17, 2013

(51) Int. Cl.
*F16B 15/08* (2006.01)
(52) U.S. Cl.
USPC ........... 411/453; 411/411; 411/424; 411/473; 411/493
(58) Field of Classification Search
USPC .............. 411/394, 411, 424, 441, 451.4, 452, 411/453, 473, 487, 493, 498
See application file for complete search history.

(56) References Cited

U.S. PATENT DOCUMENTS 2,914,983 A * 12/1959 Kopf et al. .................. 411/29
3,178,835 A * 4/1965 Burke et al. ................. 36/34 A
3,480,306 A * 11/1969 Hsu .............................. 403/281
5,443,345 A * 8/1995 Gupta ........................... 411/441
5,489,179 A * 2/1996 Gabriel et al. ................ 411/453
5,749,692 A * 5/1998 Kish et al. .................... 411/453
5,788,444 A * 8/1998 Losada ......................... 411/441
6,805,525 B2 * 10/2004 Oswald ......................... 411/499
7,207,761 B2 * 4/2007 Dill et al. ..................... 411/450
7,232,283 B2 * 6/2007 Dill et al. ..................... 411/453
2002/0071741 A1 6/2002 Oswald
2004/0223830 A1 * 11/2004 Panasik et al. ............... 411/453
2006/0018733 A1 * 1/2006 Dill et al. ..................... 411/499
2007/0217889 A1 * 9/2007 Greene et al. ................ 411/493

FOREIGN PATENT DOCUMENTS

DE  7805747 U1   2/1978
DE  4312868 C1   6/1994
EP  0164432 B1   2/1988
EP  0576034 B1   10/1996
WO  2007/043985 A1  4/2007
WO  2007/106255 A1  9/2007

* cited by examiner

*Primary Examiner* — Roberta Delisle
(74) *Attorney, Agent, or Firm* — Berenato & White, LLC

(57) ABSTRACT

The present invention relates to a screw nail (1) for connecting plane components in dry construction by means of an automatic nailer, in particular for fixing surface elements onto a metallic substructure, the screw nail having a shaft (2) on one end region of which a head (3), and on the other end of which a hole formation region (5) extending to a point (4) or to a shape similar to a point (5) are formed, the shaft (2) being provided with a knurling (6), wherein the shaft (2) has a first knurling section (6*a*), in particular in a region of the shaft (2) adjacent to the hole formation region (5) in which the knurling (6) extends substantially parallel to a central axis of the shaft (2), and at least one second knurling section (6*a*) adjacent to the latter, in which an angle of elevation (5) of the knurling (6) formed between the central axis of the shaft (2) and the knurling (6) increasing constantly towards the head (3).

10 Claims, 1 Drawing Sheet

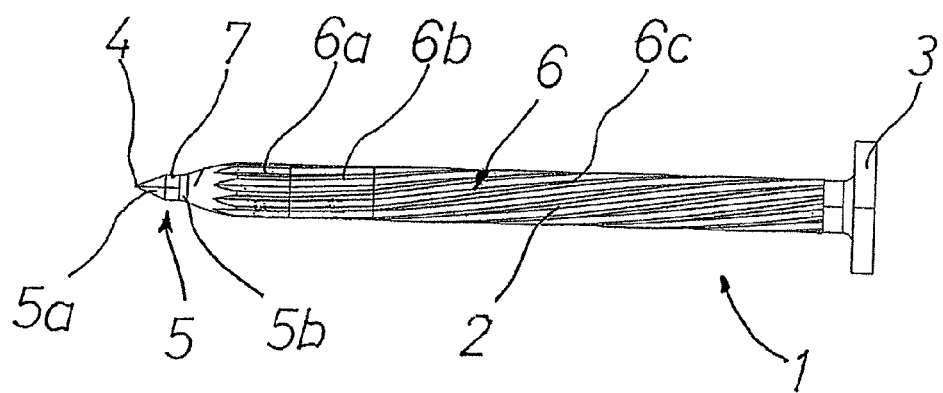

SCREW NAIL

CROSS-REFERENCE TO RELATED APPLICATIONS AND CLAIM TO PRIORITY

This application is a National Phase of International Application No. PCT/EP2009/008362 filed Nov. 24, 2009, of which the disclosures are incorporated herein by reference and to which priority is claimed.

The present invention relates to a screw nail for connecting plane components in dry construction by means of an automatic nailer, in particular for fixing surface elements onto a metallic substructure, the screw nail having a shaft on one end region of which a head, and on the other end region of which a deformation region extending to a point or to a shape similar to a point is formed, the shaft being provided with a knurling.

When attaching plasterboard panels onto metal substructures using positioning nails, loose joins are often produced which are due to insufficient interlocking of the attachment means and the supporting substructure. Upon close examination it is shown that a technically satisfactory hold is generally only produced by the attachment means not being driven in at exact right angles to the surface, but by being at different angles to one another, thus preventing one another from slipping out of the components to be attached. Alternatively one can use screw nails which are subjected to a rotational movement after being inserted into the material to be joined.

Screw nails of the type specified above are generally known. Therefore, for example, a nail is known from German utility model DE 7 805 747 which has a substantially cylindrical, knurled shaft and is used to attach surface elements, such as for example plasterboard panels, onto metallic components. The knurling of the nail shown in this publication extends substantially parallel to an axial extension of the shaft of the nail.

In order to achieve a rotatory movement of the screw nail in addition to a translatory movement implemented by the positioning device, and so to reduce the risk of undesired loosening of the nail, after being driven in by means of an automatic nailer, in a subsequent procedural step the nail can be subjected manually to a rotational movement.

Alternatively, it is also possible to use an automatic nailer which implements both translatory and rotatory movements. However, a disadvantage with such positioning devices is that the latter require substantially more time to drive the nail into the components to be joined together in comparison to purely translatory automatic nailers due to the implementation of rotatory movements and also due to the change between the translatory and the rotatory movement, and are also more expensive than purely translatory nail positioning devices.

In document DE 4 312 868 C1 a plastic nail for lightweight and porous concrete is shown. For better fixing of the nail it is proposed to form, in addition to anchoring plates and axially extending displacement grooves beneath the nail head, radially extending wings which have a circumferential component designed to have increasing strength towards the head and providing angular momentum to the nail as it is driven in. However, the production of these wings is very complex and expensive.

Furthermore, the nail is not suitable for penetrating harder materials, such as for example sheet metal substructures, and so the attachment of plasterboard panels onto metal substructures is not possible, and its use is restricted to the attachment of objects onto light-weight or porous concrete. It is also only possible with great difficulty to drive in the nails using an automatic nailer due to the forces acting on the nail when penetrating the metal substructure.

Therefore, it is the object of the present invention to provide a screw nail which can be driven in reliably by means of an automatic nailer simply with a translatory movement and which has improved pull-out values.

This object is achieved according to the invention in that the shaft has a first knurling section, in particular in a region of the shaft adjacent to the hole formation region in which the knurling extends substantially parallel to a central axis of the shaft, and at least one second knurling section adjacent to the latter, in which an angle of elevation of the knurling formed between the central axis of the shaft and the knurling increasing constantly towards the head.

In other words, by providing knurling on the shaft of the screw nail with a constantly increasing angle of elevation, it is achieved that when being driven in, the screw nail implements a constantly increasing rotation movement as it penetrates more deeply into the components to be joined together due to the constantly increasing angle of elevation of the knurling. By providing a rotational movement of the screw nail it is achieved that the screw nail rotates more softly into the components to be joined together, or at least experiences elastic rotational pretensioning which leads to the pull-out values of the screw nail being substantially improved. The first knurling section extending parallel to the central axis of the shaft provides stabilisation and maintenance of the positioning direction of the screw nail and the insertion of a thread-type structure into the material penetrated by the latter, and thus guarantees that the screw nail also engages in the material and in this way initiates a subsequent automatic rotational movement of the screw nail in the material.

Trials have shown that optimal rotational properties of the screw nail are achieved if a maximum angle of elevation in the second or subsequent knurling section of the knurling relative to the central axis of the shaft comes within the range between 3° and 50°, preferably within the range between 10° and 20°, even more preferably is 14°.

In a further exemplary embodiment of the invention the knurling has a number of knurling sections, the second or a third knurling section having an uneven increase along the shaft.

A particularly homogeneous movement of the screw nail within the components to be joined together is achieved if a profile of the knurling is disposed distributed evenly around the circumference of the shaft.

The number of threads of the knurling distributed around the circumference can be between 3 and 30, preferably in the range between 5 and 20, more preferably 10.

Here a profile depth of the knurling can decrease towards the point and come within the range between 0.01 and 0.15 mm.

In order to enable a particularly even crossover and the most impact-free possible penetration of the knurling into the components to be joined together, in one exemplary embodiment provision is made in the hole formation region, in order to gently expand the components to be penetrated, to form sections tapering towards the point, of which at least two of the sections have different degrees of tapering in relation to one another.

Particularly gentle penetration of the screw nail into the components to be penetrated is achieved by the hole formation region being at least partially ogival in form.

Alternatively, the hole formation region can also be at least partially conical or ballistic in form.

In order to keep residual stresses caused by expansion of the inlet opening of the plane material as small as possible, in one exemplary embodiment provision is made such that two sections formed in the hole formation region are connected to one another respectively by means of an intermediate stage which is in particular cylindrical. In this way it is achieved that the hole expansion takes place in stages, and between the expansions by means of the cylindrical intermediate stages the material is given the possibility of flowing, and so residual stresses are broken down, at least in some regions.

Further advantageous embodiments of the present invention are given by the sub-claims and by the following drawing.

This shows as follows:

FIG. 1 a screw nail according to the invention.

The single figure shows a screw nail 1 according to the invention for connecting plane components in dry construction by means of a high-speed automatic nailing device. The screw nail serves to fix surface elements onto a metallic substructure, as generally known in dry construction. The screw nail 1 according to the invention has a shaft 2 on one end region of which a head 3, and on the other end region of which a hole formation region 5 extending to a point 4 or to a shape similar to a point are formed.

On the shaft 2 a knurling 6 comprising ten knurling sides distributed evenly around the circumference of the shaft is formed. Furthermore, in this exemplary embodiment of the invention the knurling 6 is distributed over three knurling sections 6a, 6b, 6c. In the first knurling section 6a the knurling 6 extends constantly, substantially parallel to the central axis of the shaft 2. In this knurling section 6a the angle of elevation formed between the central axis of the shaft 2 and the knurling 6 is substantially 0°. This parallel alignment of the knurling section 6a leads to even penetration into the components to be joined together and to uniform acceleration of the screw nail 1, thus stabilising the direction of driving in. The knurling section 6a of the knurling 6 further ensures that the screw nail 1 gains a better hold in the components to be attached and introduces a thread-like structure into the material penetrated by it, and so guarantees that the screw nail 1 also engages in the material to be joined together.

In order to also add a rotatory component to the translatory movement of the screw nail 1 in order to thus improve the pull-out values of the screw nail 1, the angle of elevation of the knurling in the second knurling section 6b for initiating a rotational movement of the screw nail 1 initially increases slightly by a few degrees in order then, in the third knurling section 6c, to more greatly increase knurling 6 towards the head 3. The maximum angle of elevation of the knurling 6 according to the screw nail 1 shown in relation to the central axis of the shaft 2 is 14°. Here the knurling 6 is introduced into the shaft 2 in an anti-clockwise direction, but can, if required, also alternatively be arranged in a clockwise direction.

By providing the third knurling section 6c with a strongly increasing angle of elevation, the screw nail 1 implements a rotation movement which leads to the pullout values of the screw nail 1 within the components to be joined together being considerably improved.

Furthermore, the screw nail 1 according to the invention has special shaping of the point 4. Here the screw nail 1 has a penguin- or dolphin-shaped point 4. The technical effect of this is that when penetrating the components to be joined together, the material of the components is expanded in two stages. This means that in the region of the knurling 6 the screw nail 1 engages quickly and reliably in the components to be joined together. For this purpose, with the first, very sharp point 4 the material is first of all broken through, whereas it can be expanded with the second part of the point 5a, 5b. In this way the sheet metal material is opened more gently than with conventional point geometry. For this purpose the two sections 5a, 5b formed in the hole formation region 5 are connected to one another by means of a cylindrical intermediate stage 7.

The invention claimed is:

1. A screw nail (1) for connecting plane components in dry construction by means of an automatic nailer, in particular for fixing surface elements onto a metallic substructure, the screw nail having a shaft (2) on one end region of which a head (3), and on the other end of which a hole formation region (5) extending to a point (4) or to a shape similar to a point (5) are formed, the shaft (2) being provided with a knurling (6), characterised in that the shaft (2) has a first knurling section (6a), in particular in a region of the shaft (2) adjacent to the hole formation region (5) in which the knurling (6) extends substantially parallel to a central axis of the shaft (2), and at least one second knurling section (6a) adjacent to the latter, in which an angle of elevation (5) of the knurling (6) formed between the central axis of the shaft (2) and the knurling (6) increasing constantly towards the head (3).

2. The screw nail according to claim 1, characterised in that a maximum angle of elevation of the knurling relative to the central axis of the shaft comes within the range between 5° and 30°, preferably within the range between 10° and 20°, even more preferably is 14°.

3. The screw nail (1) according to claim 1, characterised in that at least one knurling section (6a, 6b, 6c), in particular the second (6b) or a third (6c) knurling section, has an uneven increase along the shaft (2).

4. The screw nail (1) according to claim 1, characterised in that a profile of the knurling (6) is arranged distributed evenly around the circumference of the shaft (2).

5. The screw nail according to claim 1, characterised in that the number of threads of the knurling distributed around the circumference of the shaft are between 3 and 30, preferable in the range between 5 and 20, more preferably 10.

6. The screw nail (1) according to claim 1, characterised in that a profile depth of the knurling (6) decreases towards the point (4) and comes within the range between 0.01 and 0.15 mm.

7. The screw nail (1) according claim 1, characterised in that on the hole formation region (5), in order to gently expand the components to be penetrated, a number of sections (5a, 5b) tapering towards the point (4) are formed, of which at least two of the sections (5a, 5b) have different degrees of tapering in relation to one another.

8. The screw nail (1) according to claim 1, characterised in that the hole formation region (5) is at least partially ogival in form.

9. The screw nail (1) according to claim 1, characterised in that the hole formation region (5) is at least partially conical or ballistic in form.

10. The screw nail (1) according to claim 1, characterised in that two sections (5a, 5b) formed in the hole formation region (5) are connected to one another respectively by means of an intermediate stage (7) which is in particular cylindrical.

* * * * *